United States Patent
Bae et al.

(10) Patent No.: US 8,658,753 B2
(45) Date of Patent: Feb. 25, 2014

(54) TRANSPARENT SILOXANE RESIN COMPOSITION FOR OPTICAL APPLICATIONS

(75) Inventors: Byeong-Soo Bae, Daejeon (KR); Joon-Soo Kim, Daejeon (KR); SeungCheol Yang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 147 days.

(21) Appl. No.: 12/836,315

(22) Filed: Jul. 14, 2010

(65) Prior Publication Data

US 2011/0034581 A1  Feb. 10, 2011

(30) Foreign Application Priority Data

Aug. 4, 2009 (KR) ................. 10-2009-0071588

(51) Int. Cl.
  *C08G 77/20* (2006.01)
(52) U.S. Cl.
  USPC .................. 528/32; 528/31; 528/34
(58) Field of Classification Search
  USPC .............................. 528/31, 32, 34
  See application file for complete search history.

(56) References Cited

U.S. PATENT DOCUMENTS

| | | | |
|---|---|---|---|
| 4,329,275 A * | 5/1982 | Hatanaka et al. | 524/862 |
| 5,774,603 A | 6/1998 | Moore et al. | |
| 6,054,253 A | 4/2000 | Fardad et al. | |
| 6,309,803 B1 | 10/2001 | Coudray et al. | |
| 6,391,515 B1 | 5/2002 | Su et al. | |

FOREIGN PATENT DOCUMENTS

| | | |
|---|---|---|
| KR | 100281451 B1 | 11/1994 |
| KR | 20020084376 A | 11/2002 |
| KR | 20020084377 A | 11/2002 |
| KR | 1020040047716 A | 6/2004 |
| KR | 1020050099849 A | 10/2005 |
| KR | 1020070032320 A | 3/2007 |

OTHER PUBLICATIONS

Dire et al., Siloxane-Based Nanobuilding Blocks by Reaction Between Silanediol and Trifunctional Silicon Alkoxides, Journal of Sol-Gel Science and Technology, 2004, 57-61, vol. 32.

* cited by examiner

*Primary Examiner* — Kuo-Liang Peng
(74) *Attorney, Agent, or Firm* — The Webb Law Firm

(57) ABSTRACT

A transparent siloxane resin composition for optical applications is provided including: (1) a vinyl-oligosiloxane hybrid prepared by a non-hydrolytic condensation reaction of an organoalkoxysilane having a vinyl group or a mixture of an organoalkoxysilane having a vinyl group and a metal alkoxide with an organosilanediol; (2) an organohydrosilicone compound having two or more silicon-bonded hydrogen atoms; and (3) a metal catalyst. The resulting transparent siloxane resin exhibits excellent light transmittance, light resistance and heat resistance, has refractive index and hardness suitable for optical applications, including optical devices, displays, LEDs or the like, and experiences little contraction during processing.

16 Claims, No Drawings

TRANSPARENT SILOXANE RESIN COMPOSITION FOR OPTICAL APPLICATIONS

CROSS-REFERENCE TO RELATED APPLICATIONS

This application claims priority under 35 U.S.C. §119 to Korean Patent Application No. 10-2009-0071588, filed on Aug. 4, 2009, in the Korean Intellectual Property Office, the disclosure of which is incorporated herein by reference in its entirety.

TECHNICAL FIELD

The following disclosure relates to a transparent siloxane resin composition for optical applications including: a vinyl-oligosiloxane hybrid; an organohydrosilicon compound having two or more silicon-bonded hydrogen atoms; and a metal catalyst. Transparent siloxane resin compositions for optical applications with various refractive indices, hardness, thermal stability, transmittance and flexibility can be prepared via a hydrosilylation reaction.

BACKGROUND

An inorganic/organic hybrid is advantageous in that superior flexibility, cotability and functionality of an organic substance and superior light transmittance, wear resistance, heat resistance and insulating property of an inorganic substance can be realized together, sintering is possible at low temperature, and processability is good. Accordingly, researches are actively carried out to put it into practical application for optical uses.

Conventionally, the inorganic/organic hybrid is prepared by a sol-gel method whereby a solution is prepared by hydrolysis and condensation of an organometal alkoxide using water and a catalyst, which is then cured. U.S. Pat. Nos. 6,054,253, 5,774,603 and 6,309,803 disclose applications of the inorganic/organic hybrid prepared by the sol-gel method to optical devices. However, the inorganic/organic hybrid prepared by the sol-gel method has silanol groups because the curing occurs insufficiently at low temperature. The remaining silanol groups cause a large transmission loss because they absorb light in the near infrared wavelength region at 1310 and 1550 nm. Moreover, when used for a long period of time, the silanol groups remaining inside the material may adsorb moisture in the air and thus degrade the device performance. U.S. Pat. No. 6,391,515 proposes a process for manufacturing a silica optical waveguide with silanol groups removed by preparing a solution of tetraethoxysilane via a sol-gel method and sufficiently curing by heating up to 800° C. after coating. However, this method is impractical because, unlike a pure inorganic material, when an inorganic/organic hybrid is cured at high temperature, organic groups inside the material is decomposed by heat.

Korean Patent Application Nos. 2001-23552 and 2002-23553 disclose application of an inorganic/organic hybrid prepared by the sol-gel method for a gate insulator of a TFT-LCD or a protective film for a color filter or a circuit. However, since the inorganic/organic hybrid is prepared by separately preparing an inorganic oxide sol and a polymeric organometal alkoxide and then mixing them, the risk of phase separation is high and it is difficult to attain uniform properties when applied for a large area. Further, since a large quantity of solvent is used, a problem may occur because of the evaporation of the solvent during drying. As a result, light transmittance may decrease. In addition, voltage resistance or wear resistance may be degraded since it is difficult to attain a dense structure because of poor dimensional stability.

In order to solve the aforesaid problem, Korean Patent Application No. 2004-25063 discloses a method of preparing an inorganic/organic hybrid for optical applications via a non-hydrolytic sol-gel method and then photocuring or thermally curing it using an initiator. In this method, the inorganic/organic hybrid typically has organic functional groups such as epoxy or acryl at its surface. However, since the organic functional groups have worse heat resistance, light resistance, or the like as compared to the bulk silica or silica-metal oxide composite, they result in decreased thermal stability of the inorganic/organic hybrid. Because of thermal degradation of the organic functional groups, the inorganic/organic hybrid experiences significant weight change at about 300° C. Hence, its application for optical materials requiring stability at high temperature is restricted. Further, the photocuring or thermal curing is problematic in that, since the curing is accomplished by a chain reaction initiated by the initiator, unwanted byproducts may be produced, which may degrade transparency, thermal stability, or the like. And, if the inorganic/organic hybrid has a large molecular weight, curing by the chain reaction may not occur sufficiently because of steric hindrance. As a result, thermal stability, hardness, or the like may be degraded.

SUMMARY

The present invention is directed to providing a transparent siloxane resin composition useful for various optical applications, which is prepared by thermally curing a vinyl-oligosiloxane hybrid and an organohydrosilicon compound having two or more silicon-bonded hydrogen atoms via a hydrosilylation reaction in the presence of a metal catalyst. The vinyl-oligosiloxane hybrid, which is prepared by a non-hydrolytic sol-gel method, forms a very elaborate inorganic network structure with superior transparency and high degree of degree of condensation. The present invention is also directed to providing a transparent siloxane resin composition for optical applications prepared using the vinyl-oligosiloxane hybrid, which has superior light transmittance, light resistance, heat resistance, refractive index and mechanical strength and experiences little contraction during processing.

In one general aspect, the present invention provides a transparent siloxane resin composition for optical applications, including: (1) a vinyl-oligosiloxane hybrid; (2) an organohydrosilicon compound having two or more silicon-bonded hydrogen atoms; and (3) a metal catalyst.

In detail, the present invention provides a transparent siloxane resin composition for optical applications, e.g. optical devices, displays, LEDs, or the like, which includes: a vinyl-oligosiloxane hybrid prepared by a non-hydrolytic condensation reaction of an organoalkoxysilane having a vinyl group or a mixture of an organoalkoxysilane having a vinyl group and a metal alkoxide with an organosilanediol; an organohydrosilicon compound having at least two silicon-bonded hydrogen atoms; and a metal catalyst.

The vinyl-oligosiloxane hybrid refers to a compound comprising an inorganic moiety and an organic functional group including a vinyl group bound together as a molecular unit, and is prepared from condensation of organosilane.

The vinyl-oligosiloxane hybrid included in the transparent siloxane resin composition for optical applications according to the present invention is prepared from condensation of an organoalkoxysilane having a vinyl group or a mixture comprising an organoalkoxysilane having a vinyl group and an effective amount of a metal alkoxide with an organosilanediol, and, thus, has a high degree of condensation. Since the resin is thermally cured with the organohydrosilicon compound having at least two silicon-bonded hydrogen atoms via hydrosilylation in the presence of the metal catalyst, it has superior light resistance and heat resistance, good light transmittance, high refractive index and excellent mechanical property and experiences little contraction during processing.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, the present invention is described in more detail.

The vinyl-oligosiloxane hybrid, which is the transparent siloxane resin for optical applications according to the present invention, is prepared by the sol-gel method. In particular, it is prepared from condensation of an organoalkoxysilane having a vinyl group or the mixture of an organoalkoxysilane having a vinyl group and a metal alkoxide with an organosilanediol via a non-hydrolytic sol-gel method without addition of water, as described in according to Scheme 1. The non-hydrolytic sol-gel method is different from the typical hydrolytic sol-gel method in that water is not used. The hydrolytic sol-gel method is restricted in the selection of precursors because formation of composite oxide is difficult due to different reaction rates of the two different substances. Further, it requires heat treatment at high temperature and stability decreases because of unreacted hydroxyl groups. In contrast, the non-hydrolytic sol-gel method allows formation of not only composite oxide but also vinyl-oligosiloxane hybrid using various precursors and is capable of overcoming the problem of the hydrolytic sol-gel method.

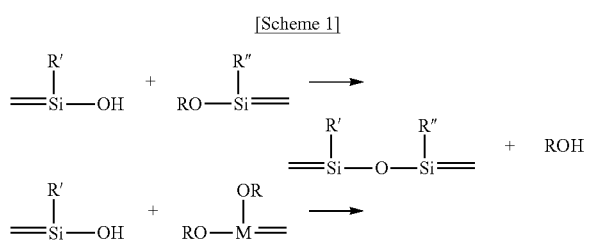

[Scheme 1]

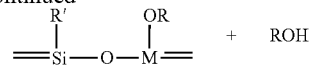

M = metal

As seen from Scheme 1, the hydroxyl group of the starting material organosilanediol is condensed with the alkoxy group of the other monomer organoalkoxysilane having a vinyl group or a mixture of the organoalkoxysilane having a vinyl group and the metal alkoxide to form an inorganic network structure. As a result, a vinyl-oligosiloxane hybrid having organic groups R' and R" including a vinyl group is prepared.

When the vinyl-oligosiloxane hybrid is prepared by the non-hydrolytic sol-gel method, since the organosilane monomer is condensed with the hydroxylorganosilane having an hydroxyl group to form the vinyl-oligosiloxane hybrid, a catalyst may be added to lower reaction temperature and to facilitate the sol-gel process. The catalyst may be a metal hydroxide such as barium hydroxide, strontium hydroxide, etc. The addition amount of the catalyst is not particularly limited. It may be sufficient to add it in an amount of 0.0001 to 10 mol % of the monomer. The reaction may be carried out by stirring at room temperature for about 6 to 72 hours. In order to facilitate the reaction and ensure complete condensation, the condensation reaction may be performed at 0 to 100° C., preferably at 40 to 80° C., for 1 to 10 hours.

The vinyl-oligosiloxane hybrid prepared by the condensation reaction includes alcohol produced as byproduct, which may be removed at atmospheric pressure or under reduced pressure and at 0 to 120° C., preferably at −0.1 MPa and at 40 to 80° C., for 10 minutes to 1 hour.

The organoalkoxysilane having a vinyl group may be selected from a compound represented by Chemical Formula 1 or a mixture thereof:

(1)

In Chemical Formula 1, $R^1$ is one or more functional group(s) selected from a (C1-C20)alkyl group, a (C3-C8)cycloalkyl group, a (C1-C20)alkyl group substituted with (C3-C8)cycloalkyl, a (C2-C20)alkenyl group, a (C2-C20)alkynyl group, a (C6-C20)aryl group, an acryl group, a methacryl group, an allyl group and a vinyl group, all of which having a vinyl group; and $R^2$ through $R^4$ are independently a linear or branched (C1-C7)alkyl group.

More specifically, it may be selected from vinyltrimethoxysilane, vinyltriethoxysilane, vinyltripropoxysilane, aryltrimethoxysilane, aryltriethoxysilane, N-(3-acryloxy-2-hydroxypropyl)-3-aminopropyltriethoxysilane, N-(3-acryloxy-2-hydroxypropyl)-3-aminopropyltrimethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, styrylethyltrimethoxysilane and a mixture thereof, but is not necessarily limited thereto.

The organosilanediol is a silane compound having an organic chain substituted or unsubstituted with functional group(s) and linked by two hydroxyl groups and may be selected from a compound represented by Chemical Formula 2 or a mixture thereof:

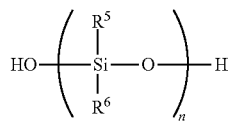 (2)

In Chemical Formula 2, $R^5$ and $R^6$ are independently a functional group selected from a (C1-C20)alkyl group, a (C3-C8)cycloalkyl group, a (C1-C20)alkyl group substituted with (C3-C8)cycloalkyl group, a (C2-C20)alkenyl group, a (C2-C20)alkynyl group, a (C6-C20)aryl group, an acryl group, a methacryl group, an allyl group, a halogen group, an amino group, a mercapto group, an ether group, an ester group, a (C1-C20)alkoxy group, a sulfone group, a nitro group, a hydroxy group, a hydride group, a cyclobutene group, a carbonyl group, a carboxyl group, an alkyd group, a urethane group, a vinyl group, a nitrile group and an epoxy group; and n is the number of units, which may be the same or different, and is an integer 1 or larger, preferably from 1 to 100000.

Specific exemplary compounds include diphenylsilanediol, diisobutylsilanediol, silanol-terminated polydimethylsiloxane, silanol-terminated diphenylsiloxane-dimethylsiloxane copolymer, silanol-terminated polydiphenylsiloxane, silanol-terminated polydiphenylsiloxane, silanol-terminated polytrifluoropropylmethylsiloxane and a mixture thereof, but are not necessarily limited thereto.

The metal alkoxide is a metal compound having an alkoxy group bound thereto and may be selected from a compound represented by Chemical Formula 3 and a mixture thereof:

$$M\text{-}(OR^7)_n \quad (3)$$

In Chemical Formula 3, M is selected from aluminum, germanium, titanium, zirconium and tantalum; n is the valence of M; and $R^7$ is a linear or branched (C1-C7)alkyl group.

Preferably, in Chemical Formula 3, n is from 1 to 5, more preferably from 3 to 5, and M is a metal with a valence of 3 to 5, for example, aluminum, germanium, titanium, zirconium or tantalum.

Specific exemplary compounds include aluminum ethoxide, tantalum ethoxide, germanium ethoxide, titanium ethoxide, zirconium ethoxide, zirconium propoxide, titanium propoxide, aluminum isopropoxide, germanium isopropoxide, titanium isopropoxide, zirconium isopropoxide, aluminum tributoxide, tantalum butoxide, aluminum t-butoxide, titanium butoxide, titanium t-butoxide, zirconium butoxide, zirconium t-butoxide or a mixture thereof, but are not necessarily limited thereto.

Preferably, the metal alkoxide, which is added to improve refractive index and increase degree of condensation of the vinyl-oligosiloxane hybrid prepared from the condensation of the organoalkoxysilane having a vinyl group and the organosilanediol, is added in an amount of 1 to 80 mol %, more preferably 20-70 mol %, based on the organoalkoxysilane. If the addition amount is too large, refractive index is improved but transmittance may decrease. And, if the addition amount is too small, refractive index is not improved enough.

Since the metal alkoxide reacts faster with the organosilanediol than the organoalkoxysilane, it is necessary to control the reaction rate of the metal alkoxide to be similar to that with the organoalkoxysilane in order to prepare a homogeneous resin composition. Preferably, a metal chelating agent is further added when adding the metal alkoxide to control the reaction of the metal alkoxide. Preferably, the metal chelating agent may be a β-diketonate compound such as acetylacetone or an organic acid having an unsaturated hydrocarbon group such as acrylic acid, methacrylic acid, etc. When the metal chelating agent is added, it is substituted at the alkoxy group of the metal alkoxide and forms a metal chelating agent-metal alkoxide complex. Preferably, the addition amount of the metal chelating agent is controlled so that the alkoxide group of the metal alkoxide is partly substituted. Specifically, it may be added in an amount of ⅕ to ½ equivalent based on the alkoxide of the metal alkoxide. The aforesaid range allows uniform distribution of the metal component in the inorganic network structure.

When preparing the vinyl-oligosiloxane hybrid of the present invention or after the preparation, a solvent may be further added to control viscosity and confer stability to the resin. The solvent is not particularly limited. Preferably, an aliphatic hydrocarbon solvent such as hexane, heptane, etc., an aromatic hydrocarbon solvent such as benzene, toluene, xylene, etc., a ketone solvent such as methyl isobutyl ketone, 1-methyl-2-pyrrolidinone, cyclohexanone, acetone, etc., an ether solvent such as tetrahydrofuran, isopropyl ether, propylene glycol propyl ether, etc., an acetate solvent such as ethyl acetate, butyl acetate, propylene glycol methyl ether acetate, etc., an alcohol solvent such as isopropyl alcohol, butyl alcohol, etc., an amide solvent such as dimethylacetamide, dimethylformamide, etc., a silicone solvent or a mixture thereof may be used.

The siloxane resin comprising the vinyl-oligosiloxane hybrid may be thermally cured with an organohydrosilicon compound having at least two silicon-bonded hydrogen atoms via a hydrosilylation reaction in the presence of a metal catalyst. The organohydrosilicon compound has at least two functional groups represented by Chemical Formula 4:

 (4)

Specific examples include phenyltrisdimethylsiloxysilane, tetrakisdimethylsiloxysilane, trifluoropropyltrisdimethylsiloxysilane, hydride-terminated polydimethylsiloxane, hydride-terminated polyphenylmethylsiloxane, trimethylsiloxy-terminated methylhydrosiloxane-dimethylsiloxane copolymer, hydride-terminated methylhydrosiloxane-dimethylsiloxane copolymer, trimethylsiloxy-terminated polymethylhydrosiloxane, triethylsiloxy-terminated polyethylhydrosiloxane, hydride-terminated polyphenyldimethylhydroxysiloxane, hydride-terminated methylhydrosiloxane-phenylmethylsiloxane copolymer and methylhydrosiloxane-octylmethylsiloxane copolymer and terpolymer having at least two functional groups represented by Chemical Formula 4, but are not necessarily limited thereto.

The organohydrosilicon compound having two or more silicon-bonded hydrogen atoms may be a hydrooligosiloxane hybrid prepared from a condensation reaction of an organosilanediol represented by Chemical Formula 2 and an organoalkoxysilane having a hydrogen atom represented by Chemical Formula 5, or a mixture of the hydrooligosiloxane hybrid and an organohydrosilicon compound having at least two functional groups represented by Chemical Formula 4:

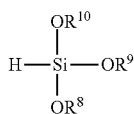

(5)

In Chemical Formula 5, $R^8$, $R^9$ and $R^{10}$ are independently a linear or branched (C1-C7)alkyl group.

Specific examples of the compound represented by Chemical Formula 5 include trimethoxysilane, triethoxysilane and a mixture thereof, but are not necessarily limited thereto. The organohydrosilicon compound is added in an amount equivalent to the vinyl group of the siloxane resin.

The siloxane resin having a vinyl group according to the present invention exhibits excellent light resistance, heat resistance, light transmittance and refractive index, has hardness adequate for optical material, and experiences little contraction during processing. Hence, it makes an ideal resin for optical applications, including optical devices, displays, LEDs, or the like.

The thermal curing may be attained via hydrosilylation in the presence of a commonly used metal catalyst. Examples of the metal catalyst include xylene platinum (~2%), i.e. a platinum(0)-1,3-divinyl-1,1,3,3-tetramethyldisiloxane complex solution, platinum-cyclovinylmethylsiloxane complex and tris(dibutylsulfide)rhodium trichloride, or the like, but are not necessarily limited thereto. The addition amount of the catalyst is not particularly limited. It is sufficient if platinum is added in an amount of 10 to 20 ppm based on the total weight of the resin.

The transparent siloxane resin composition for optical applications according to the present invention may comprises: (1) 9.00 to 89.99 wt % of the vinyl-oligosiloxane hybrid; (2) 10.00 to 90.00 wt % of the organohydrosilicon compound having two or more silicon-bonded hydrogen atoms; and (3) 0.01 to 1.00 wt % of the metal catalyst, and may be thermally cured by heat treating at 80° C. or above. After the thermal curing, the resin composition may be heat treated at 180° C. or lower, specifically at 150 to 180° C., preferably at 150° C. or lower. If the heat treatment is carried out at a temperature higher than 180° C., the bonding with the organic functional groups may be broken. And, if the temperature is too low, the additionally added solvent may not be removed well.

If necessary, the transparent siloxane resin composition for optical applications according to the present invention may further comprise one or more additive(s) selected from an inert filler, a reinforcing or non-reinforcing filler, an antiseptic, a flavor, a rheological additive, a corrosion inhibitor, an antioxidant, a photostabilizer, a flame retardant, an agent affecting electrical properties, a dispersant, a solvent, a binder, a pigment, a dye, a plasticizer, an organic polymer, a heat stabilizer, an oxide or nitride nanoparticle, a fire retardant and a heat resistant. The additionally added additive is included in an amount of 0.0001 to 30 parts by weight based on 100 parts by weight of the siloxane resin composition. The additive may be a known one or may be prepared by a known method. For example, it may include quartz powder, diatomite, clay, chalk, lithopone, carbon black, graphite, metal oxide, metal carbonate, sulfate, metal carboxylate, metal dust, glass fiber, synthetic fiber, polymer powder, dye, pigment, or the like.

The transparent siloxane resin for optical applications of the present invention comprising (1) the vinyl-oligosiloxane hybrid, (2) the organohydrosilicon compound having two or more silicon-bonded hydrogen atoms and (3) the metal catalyst may be thermally cured via a hydrosilylation reaction to be used for optical applications. Since the inorganic component and the organic component are uniformly mixed in molecular level, it has very superior resin stability, excellent mechanical and thermal properties, and good light transmittance. Further, refractive index and other various properties may be controlled by attaching various organic functional groups.

The transparent siloxane resin for optical applications according to the present invention has high refractive index and good light transmittance as well as superior heat resistance and light resistance.

EXAMPLES

The examples and experiments will now be described. The following examples and experiments are for illustrative purposes only and not intended to limit the scope of this disclosure.

Example 1

Vinyltrimethoxysilane (VTMS) and diphenylsilanediol (DPSD) were added to a 200 mL flask at a molar ratio of 1:1 (VTMS, 0.1 M:DPSD, 0.1 M=14.824 g:21.631 g). Then, barium hydroxide was added as a catalyst at 0.1 mol % (0.0379 g) based on the silane. After stirring at 80° C. for 72 hours, methanol remaining in the resin was removed at −0.1 MPa and 60° C. for 30 minutes using a vacuum evaporator. An organic oligosiloxane resin modified with a vinyl group and a phenyl group was yielded. To thus prepared organic oligosiloxane resin (Resin A), phenyltrisdimethylsiloxysilane (PTDMSS) was added as an organohydrosilicon compound at a equivalence ratio of 1:1 (Resin A:PTDMSS=5 g:1.83 g) and xylene platinum (~2%, 0.003415 g), i.e. a platinum(0)-1,3-divinyl-1,1,3,3-tetramethyldisiloxane complex solution, was added as a metal catalyst so that the quantity of platinum was 10 ppm based on the total weight of the resin. The resin was put in a 1 mm-thick mold made of glass and then cured at 150° C. for 2 hours.

Example 2

VTMS and DPSD were added to a 200 mL flask at a molar ratio of 0.9:1.1 (VTMS, 0.09 M:DPSD, 0.11 M=13.342 g:23.794 g). Then, barium hydroxide was added as a catalyst at 0.1 mol % (0.0379 g) based on the silane. After stirring at 80° C. for 72 hours, methanol remaining in the resin was removed at −0.1 MPa and 60° C. for 30 minutes using a vacuum evaporator. An organic oligosiloxane resin modified with a vinyl group and a phenyl group was yielded. To thus prepared organic oligosiloxane resin (Resin B), PTDMSS was added as an organohydrosilicon compound at a equivalence ratio of 1:1 (Resin B:PTDMSS=5 g: 1.65 g) and xylene platinum (~2%, 0.003325 g), i.e. a platinum(0)-1,3-divinyl-1,1,3,3-tetramethyldisiloxane complex solution, was added as a metal catalyst so that the quantity of platinum was 10 ppm based on the total weight of the resin. The resin was put in a 1 mm-thick mold made of glass and then cured at 150° C. for 2 hours.

Example 3

VTMS, titanium isopropoxide (TIP), acetylacetone (ACAC) and DPSD were added to a 200 mL flask at a molar ratio of 1.2:0.8:0.8:3 (VTMS, 0.06 M:TIP, 0.04 M:ACAC, 0.04 M:DPSD, 0.15 M=8.89 g:11.37 g:4.00 g:32.45 g). Then, barium hydroxide was added as a catalyst at 0.1 mol % (0.0549 g) based on the silane. After stirring at 80° C. for 72 hours, methanol remaining in the resin was removed at −0.1 MPa and 60° C. for 30 minutes using a vacuum evaporator. An organic oligosiloxane resin modified with a vinyl group and a phenyl group was yielded. To thus prepared organic oligosiloxane resin (Resin C), PTDMSS was added as an organohydrosilicon compound at a equivalence ratio of 1:1 (Resin C:PTDMSS=5 g: 0.702 g) and xylene platinum (~2%, 0.002851 g), i.e. a platinum(0)-1,3-divinyl-1,1,3,3-tetramethyldisiloxane complex solution, was added as a metal catalyst so that the quantity of platinum was 10 ppm based on the total weight of the resin. The resin was put in a 1 mm-thick mold made of glass and then cured at 150° C. for 2 hours.

Example 4

VTMS, zirconium isopropoxide (ZIP), methacrylic acid (MAA) and DPSD were added to a 200 mL flask at a molar ratio of 1.2:0.8:0.8:3 (VTMS, 0.06 M:ZIP, 0.04 M:MAA, 0.04 M:DPSD, 0.15 M=8.89 g:13.10 g:3.44 g:32.45 g). Then, barium hydroxide was added as a catalyst at 0.1 mol % (0.0549 g) based on the silane. After stirring at 80° C. for 72 hours, p-xylene was added at 10% of the total weight (4.827 g) and methanol remaining in the resin was removed at −0.1 MPa and 60° C. for 30 minutes using a vacuum evaporator. An organic oligosiloxane resin modified with a vinyl group and a phenyl group was yielded. To thus prepared organic oligosiloxane resin (Resin D), PTDMSS was added as an organohydrosilicon compound at a equivalence ratio of 1:1 (Resin D:PTDMSS=5 g:0.6849 g) and xylene platinum (~2%, 0.002842 g), i.e. a platinum(0)-1,3-divinyl-1,1,3,3-tetramethyldisiloxane complex solution, was added as a metal catalyst so that the quantity of platinum was 10 ppm based on the total weight of the resin. The resin was put in a 1 mm-thick mold made of glass and then cured at 150° C. for 2 hours.

Example 5

Triethoxysilane (TES) and DPSD were added to a 200 mL flask at a molar ratio of 1:1 (TES, 0.1 M:DPSD, 0.1 M=16.427 g:21.631 g). Then, barium hydroxide was added as a catalyst at 0.1 mol % (0.0379 g) based on the silane. After stirring at 80° C. for 72 hours, methanol remaining in the resin was removed at −0.1 MPa and 60° C. for 30 minutes using a vacuum evaporator. An organic oligosiloxane resin (Resin E) modified with a hydrogen group and a phenyl group was yielded. Thus prepared resin was added as an organohydrosilicon compound to the organic oligosiloxane resin modified with a vinyl group and a phenyl group prepared in Example 1 (Resin A) at a equivalence ratio of 1:1 (Resin A:Resin E=5 g:5.2667 g) and xylene platinum (~2%, 0.005133 g), i.e. a platinum(0)-1,3-divinyl-1,1,3,3-tetramethyldisiloxane complex solution, was added as a metal catalyst so that the quantity of platinum was 10 ppm based on the total weight of the resin. The resin was put in a 1 mm-thick mold made of glass and then cured at 150° C. for 2 hours.

Example 6

The organic oligosiloxane resin modified with a hydrogen group and a phenyl group prepared in Example 5 (Resin E) was added as an organohydrosilicon compound to the organic oligosiloxane resin modified with a vinyl group and a phenyl group prepared in Example 2 (Resin B) at a equivalence ratio of 1:1 (Resin B:Resin E=5 g:4.7386 g) and xylene platinum (~2%, 0.004869 g), i.e. a platinum(0)-1,3-divinyl-1,1,3,3-tetramethyldisiloxane complex solution, was added as a metal catalyst so that the quantity of platinum was 10 ppm based on the total weight of the resin. The resin was put in a 1 mm-thick mold made of glass and then cured at 150° C. for 2 hours.

Example 7

The organic oligosiloxane resin modified with a hydrogen group and a phenyl group prepared in Example 5 (Resin E) was added as an organohydrosilicon compound to the organic oligosiloxane resin comprising titanium and modified with a vinyl group and a phenyl group prepared in Example 3 (Resin C) at a equivalence ratio of 1:1 (Resin C:Resin E=5 g:2.0157 g) and xylene platinum (~2%, 0.003508 g), i.e. a platinum(0)-1,3-divinyl-1,1,3,3-tetramethyldisiloxane complex solution, was added as a metal catalyst so that the quantity of platinum was 10 ppm based on the total weight of the resin. The resin was put in a 1 mm-thick mold made of glass and then cured at 150° C. for 2 hours.

Example 8

The organic oligosiloxane resin modified with a hydrogen group and a phenyl group prepared in Example 5 (Resin E) was added as an organohydrosilicon compound to the organic oligosiloxane resin comprising zirconium and modified with a vinyl group and a phenyl group prepared in Example 4 (Resin D) at a equivalence ratio of 1:1 (Resin D:Resin E=5 g:1.9668 g) and xylene platinum (~2%, 0.003483 g), i.e. a platinum(0)-1,3-divinyl-1,1,3,3-tetramethyldisiloxane complex solution, was added as a metal catalyst so that the quantity of platinum was 10 ppm based on the total weight of the resin. The resin was put in a 1 mm-thick mold made of glass and then cured at 150° C. for 2 hours.

[Evaluation]

Physical properties of the samples prepared in Examples 1 to 8 were evaluated as follows. The result is shown in Tables 1 to 4.

(a) Degree of Condensation

Following NMR spectroscopic measurement (Bruker Biospin DMX600, Bruker), degree of condensation was calculated from the following equation. The degree of condensation of the organic oligosiloxane resin modified with a hydrogen group and a phenyl group prepared in Example 5 was also calculated by the same method.

$$Degree\ of\ condensation = \frac{D^1 + 2D^2 + T^1 + 2T^2 + 3T^3}{2(D^0 + D^1 + D^2) + 3(T^0 + T^1 + T^2 + T^3)} \times 100$$

In the above equation, $D^0$, $D^1$, $D^2$, $T^0$, $T^1$, $T^2$ are $T^3$ defined as in the following figure:

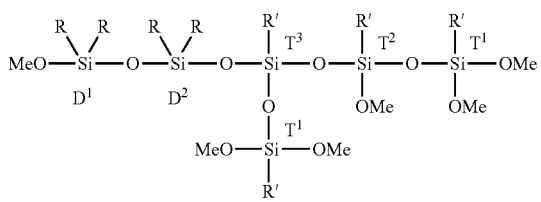

wherein R' is an organic functional group and R is a phenyl group.

(b) Transmittance

Transmittance was measured at 450 nm using a UV/VIS/NIR spectrometer (UV-3101PC, Shimadzu Corporation).

(c) Refractive Index

Refractive index was measured at 633 nm using a prism coupler (Metricon 2010, Pennington).

(d) Light Resistance

Transmittance was measured after exposing the sample to a light of 365 nm for 600 hours.

(e) Heat Resistance

Transmittance was measured after storing the sample in an oven at 120° C. for 600 hours.

(f) Hardness

Shore D hardness was measured using a Shore hardness tester (HPSD, Schmidt).

(g) Thermal Stability

Thermogravimetric analysis (TGA) was carried out using a thermogravimetric analyzer (TGA Q50, TA Instrument). When the sample was heated from room temperature to 800° C. under nitrogen atmosphere, the temperature at which the sample weight was decreased by 5% was recorded.

TABLE 1

Refractive index and Shore D hardness (The degree of condensation of the organic oligosiloxane resin modified with a hydrogen group and a phenyl group prepared in Example 5 (Resin E) was 83%.)

| | Example No. | | | | | | | |
|---|---|---|---|---|---|---|---|---|
| | 1 | 2 | 3 | 4 | 5 | 6 | 7 | 8 |
| Degree of condensation (%) | 80 | 85 | 90 | 91 | 80 | 85 | 90 | 91 |
| Refractive index | 1.54 | 1.55 | 1.58 | 1.58 | 1.55 | 1.56 | 1.59 | 1.59 |
| Hardness (Shore D) | 50 | 53 | 56 | 58 | 52 | 55 | 58 | 59 |

TABLE 2

Transmittance before and after UV irradiation

| | Example No. | | | | | | | |
|---|---|---|---|---|---|---|---|---|
| | 1 | 2 | 3 | 4 | 5 | 6 | 7 | 8 |
| Initial transmittance (%) | 93 | 92 | 87 | 88 | 92 | 91 | 83 | 84 |
| Transmittance after 600 hours (%) | 82 | 84 | 79 | 77 | 82 | 81 | 72 | 73 |

TABLE 3

Transmittance before and after heat treatment

| | Example No. | | | | | | | |
|---|---|---|---|---|---|---|---|---|
| | 1 | 2 | 3 | 4 | 5 | 6 | 7 | 8 |
| Initial transmittance (%) | 93 | 92 | 87 | 88 | 92 | 91 | 83 | 84 |
| Transmittance after 600 hours (%) | 91 | 90 | 84 | 85 | 91 | 90 | 82 | 83 |

TABLE 4

Temperature at which sample weight was decreased by 5%

| | Example No. | | | | | | | |
|---|---|---|---|---|---|---|---|---|
| | 1 | 2 | 3 | 4 | 5 | 6 | 7 | 8 |
| Temperature at which sample weight was decreased by 5% (° C.) | 415 | 420 | 425 | 425 | 420 | 425 | 430 | 430 |

Table 1 shows refractive index and hardness of the samples. Table 2 shows transmittance of the prepared samples before and after irradiating UV for 600 hours. Table 3 shows transmittance of the prepared samples before and after heat treatment at 120° C. for 600 hours. And, Table 4 shows the temperature at which the sample weight was decreased by 5% when the sample was heated from room temperature to 800° C. under nitrogen atmosphere at a rate of 5° C./min.

It can be seen that Examples 3 and 4 and Examples 7 and 8, wherein the metal alkoxide was further added to the siloxane resin of Example 1 and Example 5 respectively, show significantly improved degree of condensation and refractive index as compared to Example 1 and Example 5.

The above result reveals that the transparent siloxane resin for optical applications according to the present invention exhibits light transmittance, refractive index and hardness suitable for optical applications, as well as superior light resistance and heat resistance. Accordingly, it can be used for various optical applications, including optical devices, displays, LEDs, or the like.

While the present invention has been described with respect to the specific embodiments, it will be apparent to those skilled in the art that various changes and modifications may be made without departing from the spirit and scope of the invention as defined in the following claims.

What is claimed is:

1. A transparent siloxane resin composition for optical applications, comprising: a vinyl-oligosiloxane hybrid prepared by a non-hydrolytic condensation reaction of an organoalkoxysilane having a vinyl group, or a mixture of an organoalkoxysilane having a vinyl group and a metal alkoxide, with an organosilanediol, in the presence of a metal hydroxide catalyst; an organohydrosilicone compound having two or more silicon-bonded hydrogen atoms; and a metal catalyst.

2. The transparent siloxane resin composition for optical applications according to claim 1, wherein the organoalkoxysilane having a vinyl group is selected from a compound represented by Chemical Formula 1 or a mixture thereof:

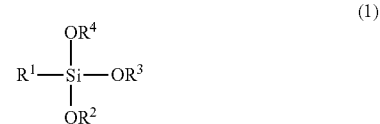

(1)

wherein
$R^1$ is a vinyl group; and R2 through R4 are independently a linear or branched (C1-C7)alkyl group.

3. The transparent siloxane resin composition for optical applications according to claim 2, wherein the organoalkoxysilane having a vinyl group is selected from vinyltrimethoxysilane, vinyltriethoxysilane, vinyltripropoxysilane, and mixtures thereof.

4. The transparent siloxane resin composition for optical applications according to claim 1, wherein the organosilanediol is selected from a compound represented by Chemical Formula 2 or a mixture thereof:

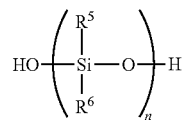 (2)

wherein
R5 and R6 are independently a group selected from a (C1-C20)alkyl group, a (C3-C8)cycloalkyl group, a (C1-C20)alkyl group substituted with (C3-C8)cycloalkyl group, a (C2-C20)alkenyl group, a (C2-C20) alkynyl group, an acryl group, a methacryl group, an allyl group, a halogen group, an amino group, a mercapto group, an ether group, an ester group, a (C1-C20) alkoxy group, a nitro group, a hydroxy group, a hydride group, a cyclobutene group, a carboxyl group, a vinyl group, a nitrile group and an epoxy group; and
n is the number of units, which may be the same or different, and is an integer from 1 to 100000.

5. The transparent siloxane resin composition for optical applications according to claim 4, wherein the organosilanediol is selected from diphenylsilanediol, diisobutylsilanediol, silanol-terminated polydimethylsiloxane, silanol-terminated diphenylsiloxane-dimethylsiloxane copolymer, silanol-terminated polydiphenylsiloxane, and mixtures thereof.

6. The transparent siloxane resin composition for optical applications according to claim 1, wherein the metal alkoxide is selected from a compound represented by Chemical Formula 3 and a mixture thereof:

M—(OR$^7$)$_n$ (3)

wherein
M is selected from aluminum, germanium, titanium, zirconium and tantalum;
n is the valence of M; and
R7 is a linear or branched (C1-C7)alkyl group.

7. The transparent siloxane resin composition for optical applications according to claim 6, wherein the metal alkoxide is selected from aluminum ethoxide, tantalum ethoxide, germanium ethoxide, titanium ethoxide, zirconium ethoxide, zirconium propoxide, titanium propoxide, aluminum isopropoxide, germanium isopropoxide, titanium isopropoxide, zirconium isopropoxide, aluminum tributoxide, tantalum butoxide, aluminum t-butoxide, titanium butoxide, titanium t-butoxide, zirconium butoxide, zirconium t-butoxide and mixtures thereof.

8. The transparent siloxane resin composition for optical applications according to claim 1, wherein the metal alkoxide is used in an amount of 1 to 80 mol % based on the organoalkoxysilane having a vinyl group.

9. The transparent siloxane resin composition for optical applications according to claim 1, wherein the mixture of the organoalkoxysilane having a vinyl group and the metal alkoxide further comprises a metal chelating agent.

10. The transparent siloxane resin composition for optical applications according to claim 9, wherein the metal chelating agent is included in an amount of 0.2 to 0.5 equivalent based on the alkoxide of the metal alkoxide.

11. The transparent siloxane resin composition for optical applications according to claim 9, wherein the metal chelating agent is selected from a β-diketonate compound and an organic acid having an unsaturated hydrocarbon group.

12. The transparent siloxane resin composition for optical applications according to claim 1, wherein the organohydrosilicone compound having two or more silicon-bonded hydrogen atoms is a hydrooligosiloxane hybrid prepared from a condensation reaction of a silanediol represented by Chemical Formula 2 and an alkoxysilane represented by Chemical Formula 5, or a mixture thereof with one or more selected from phenyltrisdimethylsiloxysilane, tetrakisdimethylsiloxysilane, trifluoropropyltrisdimethylsiloxysilane, hydride-terminated polydimethylsiloxane, hydride-terminated polyphenylmethylsiloxane, trimethylsiloxy-terminated methylhydrosiloxane-dimethylsiloxane copolymer, hydride-terminated methylhydrosiloxane-dimethylsiloxane copolymer, trimethylsiloxy-terminated polymethylhydrosiloxane, triethylsiloxy-terminated polyethylhydrosiloxane, hydride-terminated polyphenyl-dimethylhydroxysiloxane, hydride-terminated methylhydrosiloxane-phenylmethylsiloxane copolymer and methylhydrosiloxane-octylmethylsiloxane copolymer having at least two functional groups represented by Chemical Formula 4, wherein Chemical Formula 2 is represented by:

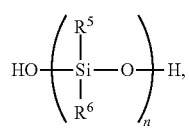 (2)

Chemical Formula 4 is represented by:

 (4), and

Chemical Formula 5 is represented by:

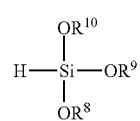 (5)

wherein
R5 and R6 are independently one or more group(s) selected from a (C1-C20)alkyl group, a (C3-C8)cycloalkyl group, a (C1-C20)alkyl group substituted with (C3-C8) cycloalkyl group, a (C2-C20)alkenyl group, a (C2-C20) alkynyl group, an acryl group, a methacryl group, an allyl group, a halogen group, an amino group, a mercapto group, an ether group, an ester group, a (C1-C20) alkoxy group, a nitro group, a hydroxy group, a hydride group, a cyclobutene group, a carboxyl group, a vinyl group, a nitrile group and an epoxy group;
R8, R9 and R10 are independently a linear or branched (C1-C7)alkyl group; and
n is the number of units, which may be the same or different, and is an integer from 1 to 100000.

13. The transparent siloxane resin composition for optical applications according to claim 12, wherein the alkoxysilane is selected from trimethoxysilane, triethoxysilane and a mixture thereof.

14. The transparent siloxane resin composition for optical applications according to claim 1, wherein the metal catalyst is a hydrosilylation catalyst selected from a platinum(0)-1,3-divinyl-1,1,3,3-tetramethyldisiloxane complex solution, platinum-cyclovinylmethylsiloxane complex and tris(dibutylsulfide)rhodium trichloride.

15. The transparent siloxane resin composition for optical applications according to claim 1, which comprises:
   9.00 to 89.99 wt % of the vinyl-oligosiloxane hybrid;
   10.00 to 90.00 wt % of the organohydrosilicone compound having two or more silicon-bonded hydrogen atoms; and
   0.01 to 1.00 wt % of the metal catalyst.

16. The transparent siloxane resin composition for optical applications according to claim 1, which comprises one or more additive(s) selected from an inert filler, a reinforcing or non-reinforcing filler, an antiseptic, a flavor, a rheological additive, a corrosion inhibitor, an antioxidant, a photo stabilizer, a flame retardant, an agent affecting electrical properties, a dispersant, a solvent, a binder, a pigment, a dye, a plasticizer, an organic polymer, a heat stabilizer, an oxide or nitride nanoparticle, a fire retardant and a heat resistant.

* * * * *